US005872182A

United States Patent [19]
Duan et al.

[11] Patent Number: 5,872,182
[45] Date of Patent: *Feb. 16, 1999

[54] WATER-BASED POLYURETHANES FOR FOOTWEAR

[75] Inventors: Youlu Duan, Minneapolis; Sonja Stammler, Marine on the St. Croix; Jillian H. Ierien, St. Paul; Brian L. Marty, Oakdale, all of Minn.

[73] Assignee: H. B. Fuller Licensing & Financing, Inc., Arden Hills, Minn.

[ * ] Notice: The term of this patent shall not extend beyond the expiration date of Pat. No. 5,608,000.

[21] Appl. No.: 561,197

[22] Filed: Nov. 21, 1995

Related U.S. Application Data

[63] Continuation-in-part of Ser. No. 304,653, Sep. 9, 1994, Pat. No. 5,608,000.

[51] Int. Cl.$^6$ .......................... C08L 75/06; C08G 18/46; C09D 175/06; C09J 175/06

[52] U.S. Cl. .................. 524/591; 36/84; 36/87; 156/331.1; 156/331.4; 156/331.7; 428/423.1; 428/423.4; 428/423.7; 428/424.2; 428/424.6; 428/424.8; 428/425.1; 428/425.8; 524/500; 524/507; 524/840; 525/123; 525/126; 525/440; 525/454; 525/455; 525/457; 525/528; 528/71; 528/905

[58] Field of Search ...................... 524/500, 507, 524/591, 840; 525/123, 126, 440, 454, 455, 457, 528; 528/71, 905; 156/331.1, 331.4, 331.7; 428/423.1, 423.4, 423.7, 424.2, 424.6, 424.8, 425.1, 425.8; 36/84, 87

[56] References Cited

U.S. PATENT DOCUMENTS

| | | | |
|---|---|---|---|
| 3,169,949 | 2/1965 | Büning | 526/189 |
| 3,479,310 | 11/1969 | Dieterich et al. | 524/591 |
| 3,705,164 | 12/1972 | Honig et al. | 524/591 |
| 3,832,333 | 8/1974 | Chang et al. | 528/354 |
| 3,867,171 | 2/1975 | Ellsworth | 428/195 |
| 3,870,684 | 3/1975 | Witt et al. | 524/591 |
| 3,919,351 | 11/1975 | Chang et al. | 428/425 |
| 4,066,591 | 1/1978 | Scriven et al. | 428/425 |
| 4,092,286 | 5/1978 | Noll et al. | 156/331 |
| 4,098,743 | 7/1978 | Scriven et al. | 528/80 |
| 4,108,814 | 8/1978 | Reiff et al. | 528/71 |
| 4,110,284 | 8/1978 | Violland et al. | 528/76 |
| 4,147,679 | 4/1979 | Scriven et al. | 428/426 |
| 4,190,566 | 2/1980 | Noll et al. | 528/76 |
| 4,203,883 | 5/1980 | Hangauer, Jr. | 528/44 |
| 4,237,264 | 12/1980 | Noll et al. | 528/67 |
| 4,254,201 | 3/1981 | Sawai et al. | 430/111 |
| 4,277,380 | 7/1981 | Williams et al. | 528/71 |
| 4,303,774 | 12/1981 | Nachtkamp et al. | 528/71 |
| 4,307,219 | 12/1981 | Larson | 528/71 |
| 4,385,137 | 5/1983 | Lorenz et al. | 523/310 |
| 4,433,095 | 2/1984 | Hombach et al. | 524/563 |
| 4,460,738 | 7/1984 | Frentzel et al. | 524/591 |
| 4,501,852 | 2/1985 | Markusch et al. | 524/591 |

(List continued on next page.)

FOREIGN PATENT DOCUMENTS

| | | |
|---|---|---|
| 673432 | 4/1966 | Belgium . |
| 764009 | 7/1967 | Canada . |
| 928323 | 6/1973 | Canada . |
| 0 237 997 A1 | 3/1987 | European Pat. Off. . |
| 0 222 289 A3 | 5/1987 | European Pat. Off. . |
| 0 296 098 A2 | 6/1988 | European Pat. Off. . |
| 0 315 832 A1 | 10/1988 | European Pat. Off. . |
| 0 369 389 A1 | 11/1989 | European Pat. Off. . |
| 0 344 912 A3 | 12/1989 | European Pat. Off. . |
| 368 172 | 5/1990 | European Pat. Off. . |
| 583 728 | 2/1994 | European Pat. Off. . |
| 666 275 | 8/1995 | European Pat. Off. . |
| 0 666 275 A2 | 9/1995 | European Pat. Off. . |
| 1443909 | 1/1965 | France . |
| 1200318 | 9/1965 | Germany . |
| 24 37 218 | 2/1976 | Germany . |
| 24 46 440 | 4/1976 | Germany . |
| 3903804 | 8/1990 | Germany . |
| 39 30 352 | 3/1991 | Germany . |
| 39 30 352 A1 | 3/1991 | Germany . |
| 41 09 447 A1 | 1/1992 | Germany . |
| 40 24 567 A1 | 2/1992 | Germany . |
| 482 761 | 1/1970 | Switzerland . |

(List continued on next page.)

OTHER PUBLICATIONS

Product Brochure: Aqueous Polyurethane Dispersions From TMXDI® (META) Aliphatic Isocyanate, Feb. 1989.

NIAX® Performance Polyether Polyol PWB–1200 (From Union Carbide Corporation), 1989.

Arendt, et al., "m–and p–TMXDI: Two New Isocyanates For The Polyurethane Industry," *Journal of Cellular Plastics*, Dec. 1982, pp.376–383.

Ryan, et al., "The Development of New Aqueous Polyurethane Dispersions for Coatings," Presented at the Water–Bourne, Higher Solids, and Powder Coatings Symposium Feb. 26–28, 1992 (14 pages).

Product Brochure for Disperscoll KA–8464, Mobay Corporation, Jul. 1990.

*Primary Examiner*—Rabon Sergent
*Attorney, Agent, or Firm*—Vidas, Arrett & Steinkraus, P.A.

[57] ABSTRACT

A water-based sulfonated polyurethane composition and footwear manufactured using the composition as as an adhesive, coating and primer. The sulfonated polyurethane is a reaction product of a) at least one polyisocyanate;

b) at least one alkylene diol;

c) at least one sulfonated polyester polyol wherein the sulfo groups thereof are present as alkali metal salts; and d) at least one dihydroxy carboxylic acid, or salt thereof. The composition may also be modified to include a dispersed polymer or copolymer of an ethylenically unsaturated monomer. Such mofified compositions may be obtained by preparing the sulfonated polyurethane in the presence of an ethylenically unsaturated monomer and subsequently subjecting the mixture to free-radical polymerization conditions.

25 Claims, No Drawings

U.S. PATENT DOCUMENTS

| | | | |
|---|---|---|---|
| 4,524,104 | 6/1985 | Hagio et al. | 428/341 |
| 4,540,633 | 9/1985 | Kucera et al. | 524/501 |
| 4,574,147 | 3/1986 | Meckel | 528/64 |
| 4,576,987 | 3/1986 | Crockatt et al. | 524/487 |
| 4,590,255 | 5/1986 | O'Connor et al. | 528/71 |
| 4,616,061 | 10/1986 | Henning et al. | 524/591 |
| 4,623,416 | 11/1986 | Henning et al. | 156/331 |
| 4,623,592 | 11/1986 | Daudé et al. | 428/423.3 |
| 4,636,546 | 1/1987 | Chao | 524/507 |
| 4,644,030 | 2/1987 | Loewrigkeit et al. | 524/457 |
| 4,663,337 | 5/1987 | Das et al. | 514/382 |
| 4,711,935 | 12/1987 | Gmoser et al. | 525/452 |
| 4,762,880 | 8/1988 | Leung | 524/853 |
| 4,764,553 | 8/1988 | Mosbach et al. | 524/591 |
| 4,791,168 | 12/1988 | Salatin et al. | 524/601 |
| 4,801,644 | 1/1989 | Coogan | 524/839 |
| 4,851,459 | 7/1989 | Ramalingam | 523/414 |
| 4,870,129 | 9/1989 | Henning et al. | 524/840 |
| 4,876,308 | 10/1989 | Melby et al. | 524/780 |
| 4,883,694 | 11/1989 | Ramalingam | 428/35.2 |
| 4,895,894 | 1/1990 | Ruetman et al. | 524/840 |
| 4,921,842 | 5/1990 | Henning et al. | 524/839 |
| 4,923,756 | 5/1990 | Chung et al. | 428/423.7 |
| 4,927,961 | 5/1990 | Fock et al. | 524/591 |
| 4,954,389 | 9/1990 | Acharya et al. | 428/212 |
| 4,963,637 | 10/1990 | Barksby | 528/59 |
| 5,001,189 | 3/1991 | Fock et al. | 524/840 |
| 5,023,309 | 6/1991 | Kruse et al. | 528/49 |
| 5,039,732 | 8/1991 | Arora | 524/591 |
| 5,115,013 | 5/1992 | Röttger et al. | 524/457 |
| 5,124,424 | 6/1992 | Endo et al. | 528/48 |
| 5,173,526 | 12/1992 | Vijayendran et al. | 524/547 |
| 5,250,610 | 10/1993 | Hansel et al. | 524/591 |
| 5,331,039 | 7/1994 | Blum et al. | 524/507 |
| 5,334,690 | 8/1994 | Schafheatle et al. | 528/71 |
| 5,344,873 | 9/1994 | Blum | 524/591 |
| 5,432,228 | 7/1995 | Hilken et al. | 524/591 |
| 5,455,293 | 10/1995 | Wood et al. | 524/271 |
| 5,541,251 | 7/1996 | Bontinck et al. | 524/507 |
| 5,608,000 | 3/1997 | Duan et al. | 524/591 |
| 5,610,232 | 3/1997 | Duan et al. | 524/840 |
| 5,637,639 | 6/1997 | Duan et al. | 524/591 |

FOREIGN PATENT DOCUMENTS

| | | |
|---|---|---|
| 1128568 | 9/1968 | United Kingdom . |
| 91/15529 | 10/1991 | WIPO . |
| 92/02568 | 2/1992 | WIPO . |
| 92/16576 | 10/1992 | WIPO . |
| 95/08583 | 3/1995 | WIPO . |
| 96/07540 | 3/1996 | WIPO . |

WATER-BASED POLYURETHANES FOR FOOTWEAR

CROSS-REFERENCE TO RELATED APPLICATION

This application is a continuation-in-part of Copending application Ser. No. 08/304,653, filed Sep. 9, 1994, now U.S. Pat. No. 5,608,000 incorporated herein by reference.

BACKGROUND OF THE INVENTION

1. Field of the Invention

This invention relates to water-based adhesives, coatings and primers. Specifically, it relates to water-based polyurethane compositions having improved characteristics such as adhesion, peel strength and heat resistance. More specifically, it relates to one-component water-based sulfonated polyurethane compositions useful as adhesives, coatings and primers in the manufacture of footwear and to footwear and a method of preparing footwear using such compositions.

2. Description of the Prior Art

It is generally known that water-based sulfonated polyurethanes are useful in the manufacture of footwear. References describing such include the following:

U.S. Pat. No. 5,334,690 (Hoechst Aktiengesellschaft, Fed.) discloses water-based sulfonated polyurethanes which are obtained by reacting ionic polyester polyols, polycarbonate polyols and polyether polyols or mixtures thereof with a polyisocyanate or mixtures of polyisocyanates. The water-based sulfonated polyurethane special feature are the ionic groups present in the polyol segment. These polymers are described as being especially useful in the production of adhesive bonds for the shoe industry.

German Pat. No. DE 3930352 (REIA GMBH) discloses a process for bonding parts of shoes by applying water-based sulfonated polyurethane adhesives and drying with a microwave heater before bringing the parts together. The water-based sulfonated polyurethane Dispercoll U KA-8464 from Bayer Corporation is referenced.

"Waterbased high performance adhesive materials", Warrach., Presented at Proceedings of the ASC Division of Polymeric Materials Conference, Miami Beach, Fla., Sep. 11–18, 1989. The article describes water-based sulfonated polyurethane polymers, and their formulations, yielding good adhesion to substrates often used in the manufacture of footwear like PVC, ABS, polyurethanes, nylon, leather and fabrics.

A draw back for these prior art compositions is their failure to pass minimum adhesion standards in footwear applications, set by the Association of European Adhesive Manufacturers (FEICA), as one-component formulations. To pass minimum adhesion standards, two-component adhesive formulations are required. For example, bond strengths when subjected to thermal and mechanical stresses can be improved by the addition of water dispersible polyfunctional crosslinking agents selected from a group consisting of isocyanates, aziridines, melamine resins, epoxies, oxazolines and carbodiimides. However, a disadvantage associated with two component formulations is their limited pot life due to coagulation, gelling and viscosity increase. Furthermore, two-component adhesives have to be mixed from separate components directly before use. This can give rise to unsatisfactory adhesive bonds or a shortened pot life through inexact metering of the components making the system less user friendly. Also, exposure to latent crosslinking agents can pose a health risk through skin contact or inhalation.

There remains a need for improved one-component water-based adhesives, coatings and primers. One-component water-based compositions are easier to handle, safer and generally cost less. The present inventors have now discovered new one-component water-based sulfonated polyurethane adhesives compositions which pass FEICA minimum specifications for sole bonding. The present inventors have also discovered two-component water-based sulfonated polyurethane compositions having improved performance over previously known two-component systems.

SUMMARY OF THE INVENTION

The present invention is directed to new water-based sulfonated polyurethane compositions which are useful as adhesives, coatings and primers in the manufacture of footwear, comprising a dispersion in an aqueous vehicle of a reaction product of:

a) at least one polyisocyanate component;
b) at least one alkylene diol component;
c) at least one sulfonated polyester polyol component wherein the sulfo groups are present in the form of alkali metal salts; and
d) at least one dihydroxy carboxylic acid or salt thereof selected from the group consisting of alkali metal salts, organic tertiary amine salts and mixtures thereof.

If the carboxyl groups of the dihydroxy carboxylic acid are not in the form of alkali metal salts and/or organic tertiary amine salts at the time of reaction to form the polyurethane polymer, they are converted thereto by the time the polymer is dispersed in the aqueous vehicle.

Surprisingly, the polymers of the invention are characterized as having low heat activation temperatures in a range from about 50° C. to about 95° C. and rapidly develop heat resistance greater than about 110° C., without internal or external crosslinking agents. The unique one-component water-based adhesives pass minimum adhesion standards set by the Association of European Adhesive Manufacturers (FEICA).

In order to meet requirements in footwear applications, such as wet out, viscosity, green strength, peel strength, water resistance, heat resistance and cost, it maybe desirable to compound the water-based sulfonated polyurethanes. Further formulations of the invention comprise a mixture of:

a) a water-based sulfonated polyurethane as previously described;
b) at least one non-polyurethane based water dispersible polymer selected from the group consisting of acrylics, vinyl/acrylics, styrene/acrylics, vinyl-acetate/ethylene copolymers, polychloroprenes, styrene emulsions, styrene/butadiene emulsions, starches, dextrins, caseins, animal pectines and mixtures thereof;
c) at least one compounding additive selected from a group consisting of thickening agents, surfactants, coalescing aids and plasticizers and mixtures thereof; and optionally,
d) at least one water dispersible polyfunctional crosslinking agent selected from the group consisting of isocyanates, aziridines, melamine resins, epoxies and carbodiimides and mixtures thereof.

Because adhesion properties can vary with coating weights and substrates, two-component adhesives may be formulated to pass a particular manufacturer's specification. The present invention also comprises two-component water-based polyurethanes which exceed the performance characteristics of two-component water-based adhesives currently available for use in the manufacture of footwear.

The water-based sulfonated polyurethane compositions of the present invention generate useful coatings and primers. As coatings, in the manufacture of footwear, the polymers are tough but flexible, offering a protective layer which acts as a barrier to water, oil, and as solvent. As a primer, the polymers are especially useful on difficult to adhere to surfaces such as oily leathers and porous substrates.

The present invention further comprises water-based sulfonated polyurethane/acrylic or water-based sulfonated polyurethane/vinyl polymers wherein the polyurethanes disclosed above are synthesized in the presence of ethylenically unsaturated monomers to generate useful water-based blends of polyurethane/acrylic-or-vinyl polymers. Such processes are described in U.S. Pat. No. 5,173,526 (Air Products and Chemicals, Inc.), U.S. Pat. No. 4,644,030 (Witco Corporation) and EP-A-No. 95101621.1. These processes reduce the use of volatile organic compounds (VOC) and generate polymer blends with enhanced interpenetrating polymer networks which ultimately improve the physical properties of the dried films as adhesives, coatings and primers.

The water-based sulfonated polyurethane compositions and formulations of the present invention outperform existing waterbased products currently available for use in the manufacture of footwear. These characteristics are attributed to the unique properties of the sulfonated polyurethane polymers.

DETAILED DESCRIPTION OF THE INVENTION

In the instant invention, the polyurethane is a water-based sulfonated polyurethane wherein the sulfonate functional group is in the soft segment of the polyurethane. The term "polyurethane" is defined as a polymer containing two or more urethane groups and is also intended to cover polyurethane-urea polymers. Examples of such polymers are described in copending application Ser. No. 08/304/653, filed Sep. 9, 1994 now U.S. Pat. No. 5,608,000.

The diisocyanates which are used in forming the sulfonated polyurethane can be aliphatic or aromatic diisocyanates or their mixtures. Examples of suitable aliphatic diisocyanates are isophorone diisocyanate (IPDI), cyclopentylenediisocyanate, cyclohexylenediisocyanate, methylcyclohexylenediisocyanate, dicyclohexylmethanediisocyanate, hexamethylenediisocyanate (HDI), dicyclohexylmethanediisocyanate (H12MDI), and tetramethylxylyenediisocyanate (TMXDI). Examples of suitable aromatic diisocyanates are phenylenediisocyanate, tolylenediisocyanate (TDI), xylylenediisocyanate, biphenylenediisocyanate, naphthylenediisocyanate and diphenylmethanediisocyanate (MDI).

Preferably, the alkylene diol component of the sulfonated polyurethane is a $C_2$–$C_8$ alkylene diol or mixture thereof, most preferably a $C_3$–$C_6$ alkylene diol or mixture thereof. Examples of the diols are ethylene glycol, 1,3-propylene glycol, 1,4-butanediol (1,4-BD) and 1,6-hexanediol.

The sulfonated polyester polyols used to form the sulfonated polyurethane may be any polyester polyol which incorporates sulfonate groups via sulfonate functional dicarboxylic acid residues and/or sulfonate functional diol residues. The sulfonate functional groups are in alkali salt form. Typically such sulfonate functional dicarboxylic acid residues and/or sulfonate functional diol residues are a minor portion of the diol and/diacid moieties of the polyester, preferably 1.0%–10.0% by weight of the polyester. The non-sulfonated diacids and diols used in forming the sulfonated polyesters may be aromatic or aliphatic. Examples of the non-sulfonated diacids include adipic, azelaic, succinic, suberic and phthalic acids. Examples of the non-sulfonated diols include ethylene glycol, condensates of ethylene glycols, butanediol, butenediol, propanediol, neopentylglycol, hexanediol, 1,4-cyclohexane dimethanol, 1,2-propylene glycol and 2-methyl-1,3 propanediol. Examples of the sulfonate diacids include sulfoisophthalic acid, 1,3-dihydroxybutane sulfonic acid and sulfosuccinic acid. Examples of the sulfonate diols include 1,4 dihydroxybutane sulfonic acid and succinaldehyde disodium bisulfite.

The dihydroxy carboxylic acids used to form the sulfonated polyurethane are compounds of the formula:

wherein R represents a straight or branched, hydrocarbon radical containing 1 to 12 carbon atoms. Preferably, the dihydroxy carboxylic acid is an α,α-dimethylol alkanoic acid represented by the formula:

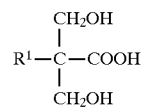

where $R^1$ denotes hydrogen or an alkyl group with up to about 20 carbon atoms. Examples of such compounds are 2,2-dimethylolacetic acid, 2,2-dimethylolpropionic acid, 2,2-dimethylolbutyric acid and 2,2-dimethylolpentanic acid. The preferred dihydroxyalkanoic acid is 2,2-dimethylolpropionic acid (DMPA).

The carboxylate groups of the dihydroxy carboxylic acid is neutralized to form alkali or tertiary amine alkali groups in order to stabilize the dispersion of the sulfonated polyurethane. The neutralization may be accomplished before, or during dispersion of the sulfonated polyurethane polymer in water.

The preferred water-based sulfonated polyurethane is a high molecular weight, crystalline, polyester based polyurethane polymer formed from mixtures of isophorone diisocyanate and hexamethylene diisocyanate. The water-based sulfonated polyurethane solids are present from about 15 parts to about 95 parts by weight, and preferably from about 50 parts to about 95 parts by weight, based on 100 parts total solids. These polymers contain unique properties important in the development of improved adhesives, coatings and primers for footwear. The water-based sulfonated polyurethane compositions contain ionomers, in the soft and hard segments of the molecule, capable of strong hydrogen bonding and ionic dipole interactions. It is surmised that the strong intermolecular forces and high degree of crystallization, inherent in these polymers, generate enhanced thermal and solvent resistance properties as well as good adhesion through mechanical interlocking. A surprising feature of the invention is that the polymers have low heat activation temperatures in a range from about 50° C. to about 95° C. and rapidly develop high heat resistant bonds greater than about 110° C., preferably greater than about 120° C., without internal or external crosslinking agents.

The adhesives, coatings and primers of the invention may also include other non-polyurethane based water dispersible polymers and copolymers selected from a group consisting of acrylics, vinyl/acrylics, styrenelacrylics, vinyl acetate-ethylene copolymers, polychloroprenes, styrene emulsions, styrene-butadiene emulsions, starches, dextrins, caseins, animal pectins and mixtures thereof. When present in the formulations, the water-based polymer and copolymer solids comprise from about 5 parts to about 95 parts by weight, and preferably from about 5 parts to about 50 parts by weight based on 100 parts total solids.

The adhesives, primers, and coatings of the invention may also include compounding additives. Compounding additives include thickening agents, surfactants, coalescing aids and plasticizers. A preferred associative thickening agent is DSX-1550 from Henkel Corporation. A preferred non-ionic surfactant is Pentex 99 from Rhone Poulenc. A particularly preferred coalescing aid is Reentry KNI-2000 which is a terpene mixture from Environmental Solvents Corporation. Useful plasticizers are selected from the group consisting of alkyl and aryl sulfonamides, benzoates esters, phthalate esters, adipates, citrates and mixtures thereof. A preferred plasticizer is Uniplex 108 from Initex Chemical Corporation. When compounding additives are present in the formulations, their solids content can vary from about 0.5 parts to about 30 parts by weight, and preferably from about 0.5 parts to about 25 parts by weight, based on 100 parts total solids.

As two-component adhesives, primers, and coatings, the formulations may include water dispersible polyfunctional crosslinking agents selected from the group consisting of isocyanates, aziridines, melamine resins, epoxies, oxazolines, and carbodiimides. Particularly preferred crosslinking agents are water dispersible polyfunctional isocyanates. When present in the formulations, the amount of crosslinking agent solids can vary from about 3 parts to about 35 parts by weight, and preferably from about 8 parts to about 20 parts by weight, based on 100 parts total solids.

As an adhesive, the water-based polymer compositions or formulations of the invention can be accomplished in one-side mode or two-side mode. In the one-side mode, the adhesive is applied to one of two substrates and dried. The adhesive is heat activated and the substrates are brought together with pressure. In the two-side mode, the adhesive is applied to both substrates, dried, then heat activated and brought together with pressure. It is possible, in both modes, to dry and heat activate the adhesive in the same step.

The adhesives can be used either in the aqueous form or in the form of a cast film and are useful in the construction of uppers made of leather, polyurethane, polyvinyl chloride, and textile materials. The adhesives are also useful in sole bonding operations employing cup-sole, welt and stitch-down constructions and can be used for attaching direct injection molded soles.

To successfully prepare the adhesive, primer, and coating formulations a sequential mix process is used. The water-based sulfonated polyurethane and water-based sulfonated polyurethane/acrylic-or-vinyl polymers are blended with other non-polyurethane based water dispersible polymers and copolymers. Compounding additives are then blended in with mild agitation. If two-component formulations are required, the water dispersible polyfunctional crosslinking agents must be mixed into the formulations directly before use.

The present invention is further illustrated by the following non-limiting examples.

EXAMPLES

Example 1 & Comparative Example 1-C

Example 1 describes the synthesis of a preferred water-based sulfonated polyurethane polymer, useful as an adhesive, coating and primer in the manufacture of footwear.

To a reaction flask was charged 21.43 grams (0.021 hydroxyl equivalents) of molten Rucoflex® XS-5483-55 which is a sulfonated polyester polyol from Ruco Polymer Corporation, 1.00 grams (0.015 hydroxyl equivalents) dimethylolpropionic acid, and 1.127 grams (0.025 hydroxyl equivalents) 1,4-butanediol. The mixture was heated to 55° C. then charged with 3.11 grams (0.0279 isocyanate equivalents) isophorone diisocyanate, 4.71 grams (0.056 isocyanate equivalents) 1,6-diisocyantohexane, and 7.01 grams (solvent) anhydrous acetone. The mixture was heated at 70° C. for approximately 3 hours then cooled to 55° C. The isocyanate terminated prepolymer was charged with 0.60 grams (0.006 moles) triethylamine then stirred for 10 minutes. The prepolymer was then dispersed in 55.43 grams deionized water and chain extended with a solution containing 0.54 grams (0.02 amine equivalents) ethylenediamine and 5.0 grams deionized water. The aqueous properties are described below:

pH=8.0

Solids=35%

Viscosity=250 mPa.s

Color wet=White

The formulation of comparative Example 1-C is Dispercoll U KA-8464, a commercially available water-based sulfonated polyurethane from Mobay Corporation. The formulations of Example 1 and Example 1-C were tested for peel adhesion failure temperatures according to the test method described below: 180° Peel Adhesion Failure Temperature Procedure:

The wet samples were drawn down on untreated, pressed, and polished polyvinyl chloride (PVC) sheets with a #40 Meyer rod and dried twenty four hours at ambient room temperature. A second PVC sheet was placed over the dried films and 2.54×15.24 centimeter strips were cut. The individual strips were heat activated, using variable temperatures, on a Sentinel heat sealer at 3.515 kilograms per square centimeter for 30 seconds. After 7 days of aging, at ambient room temperature, the strips were placed in a Tenny® oven using 0.1 kilogram weights and subjected to a 25° C. increase each hour until bond failure. Bond failure temperatures were recorded up to 126° C. by the Tenny® oven sensing unit, and the results are provided below:

| Test Sample | 51.6° C. | 65.5° C. | 79.4° C. | 93.3° C. |
|---|---|---|---|---|
| Example 1 polymer | >126° C. | >126° C. | >126° C. | >126° C. |
| Example 1-C | 93° C. | 104° C | 105° C. | 106° C. |

Example 2 & Comparative Example 2-C

Example 2 was made to compare the 180° peel strengths, bonding various substrates using Dispercoll U KA-8464 and the polymer described in example 1. The adhesive formulations, test procedures and results are described below.

The water-based sulfonated polyurethane viscosities were increased to approximately 3000 mPa.s with the associative thickener DSX-1550 from Henkel Corporation. The surfactant Pentex 99 from Rhone Poulenc was also added to improve the formulations's wet out characteristics. The formulations were as described below:

| Materials | Example 2 (grams) | Comparative Example 2-C (grams) |
| --- | --- | --- |
| Example #1 Polymer | 99.18 | — |
| Dispercoll U KA-8464 | — | 94.40 |
| DSX-1550/water (50/50) | 0.56 | 0.32 |
| Pentex 99 | 0.26 | 0.24 |
| Desmodur DA | — | 5.0 |

Test procedures were performed in accordance with the Association of European Adhesive Manufacturers (FEICA). Initially, 2.54 centimeter by 15.24 centimeter strips of substrate were surface treated using the following materials and methods:

| Substrate | Surface Preparation |
| --- | --- |
| Leather | roughed with 36 grit sandpaper using a belt sander |
| Styrene-Butadiene Rubber (SBR) | roughed with 36 grit sandpaper using a belt sander |
| Nitrile Rubber (NBR) | roughed with 36 grit sandpaper using a belt sander |
| Thermoplastic Rubber (SBS or TPR) | halogenated with a 2% solution of trichloroisocyanuric acid (TCICA) in ethyl acetate allowed to air dry for 1 hour before applying adhesive |
| Polyvinylchloride (PVC) | wiped with ethyl acetate |

The adhesive formulations were then coated on each of the two pieces to be bonded using Meyer rods to generate a total dried coat weight of approximately 175 g/m$^2$. The dry adhesive films were heat activated at 70° C. and pressed at 85 psi for 15 seconds. After 5 days aging at 23° C. and 50% relative humidity, 180° peel strengths were tested on an Instron® 1123 using a cross-head speed of 100 mm/min. The peel strengths were recorded in N/mm.

The FEICA specification for sole bonding adhesives is 5.0 N/mm, with an industry standard coat weight of 175 g/m2. The results of these samples are shown below, with coating weights normalized to the standard coating weight.

| | leather/ SBR | SBR/SBR | NBR/NBR | PVC/PVC | SBS/SBS |
| --- | --- | --- | --- | --- | --- |
| Example 2 | 3.47 | 3.89 | 2.40 | 5.36 | 7.60 |
| Comparative Example 2-C | 2.80 | 1.63 | 3.20 | 1.46 | 1.27 |

Different coating weights, actual, were also made for bonding PVC to PVC. The results of these weight variations, and the peel adhesion differences, are shown below:

| Coat Weight (g/m$^2$) | 76 | ~152 | ~228 | ~304 | ~380 |
| --- | --- | --- | --- | --- | --- |
| Example 2 | 3.66 | 4.87 | 6.48 | 8.63 | 11.49 |

Example 3 & Comparative Example 3-C

Example 3 was made to compare the adhesive properties of a two-component water-based sulfonated polyurethane of the present invention with a two-component water-based sulfonated polyurethane currently available for use in the manufacture of footwear. The formulation of Example 2 above was further blended with 5 parts crosslinker per 95 parts of wet sample. The crosslinker employed was Desmodur DA which is a water dispersible polyfunctional isocyanate from Miles Inc. The formulations were tested exactly as described in Example 2 bonding SBR to SBR. At an approximate dried coat weight of 130 g/m2, Example 3 exhibited an average peel strength of 7.00 N/mm while the average peel strength of Example 3-C was 4.75 N/mm. Example 3-C is the same as 2-C, except at a coating weight of 135 g/m2.

Example 4

This example describes the synthesis and properties of a preferred water-based sulfonated polyurethane/acrylic polymer.

To a reaction flask was charged 213.8 grams (0.21 hydroxyl equivalents) of molten Rucoflex XS-5483-55 which is a sulfonated polyester polyol from Ruco Corporation, 10.05 grams (0.15 hydroxyl equivalents) dimethylolpropionic acid, 6.75 grams (0.15 hydroxyl equivalents) 1,4-butanediol, 37.97 grams methyl methacrylate and 37.97 grams butyl acrylate. The mixture was heated to 55° C. then charged with 25.9 grams (0.23 isocyanate equivalents) isophorone diisocyanate and 39.2 grams (0.46 isocyanate equivalents) 1,6-diisocyantohexane. The mixture was heated at 70° C. for approximately 3 hours. The isocyanate terminated sulfonated polyurethane prepolymeri-monomer mixture was then charged with 8.0 grams (0.8 moles) triethylamine and stirred for 10 minutes. The prepolymer was dispersed in 554.5 grams deionized water. To the dispersion was charged, over a 10 minute period, a solution containing 0.20 grams ammonium peroxydisulfate and 20 grams deionized water. Free radical emulsion polymerization was completed by heating to 80° C. for approximately 3 hours. The aqueous and dried polymer properties are described below:

pH=7.7

Viscosity=900 mPa.s

Effective diameter=228 nm

Mean diameter=494 nm

Adhesion testing:

The wet sample was drawn down on an untreated, pressed and polished PVC sheet using a number 40 Meyer rod and dried 24 hours at ambient room temperature. A second PVC sheet was placed over the dried film and 2.54 cm×15.24 cm strips were cut. The individual strips were heat activated, using variable temperatures, on a Sentinel® heat sealer at 3.515 kilograms per square centimeter for 30 seconds. After 24 and 168 hours aging, at ambient room temperature, the strips were tested on a Intellect® 500 for 180° peel values. The results are provided below:

| Aging | 51.6° C. | 65.5° C. | 79.4° C. | 93.3° C. |
| --- | --- | --- | --- | --- |
| 24 hours | 2.1 kg/cm | 3.0 Kg/cm | 4.4 Kg/cm | 5.3 Kg/cm |
| 168 hours | 3.2 Kg/cm | SF | SF | SF |

SF = Substrate Failure

The 180° peel adhesion failure temperature was tested using the procedure as described in example 2. The results are provided below:

| Heat activation Temperature | 51.6° C. | 65.5° C. | 79.4° C. | 93.3° C. |
| Failure Temperature | 58.7° C. | >126° C. | >126° C. | >126° C. |

Example 5

This was made in the same manner as Example 1 except the composition of this example did not contain a chain extender.

Example 6

The polymer of Example 5 was used to prepare a formulation as follows:

|  | Example 6 |
| --- | --- |
| Example 5 polymer | 99.45 |
| DSX-1550/water (50/50) | 0.05 |
| Surfynol 465 | 0.05 |

The example 6 formulation was tested in the same manner as described in example 2 and the results are shown below:

|  | leather/SBR | SBR/SBR | NBR/NBR | PVC/PVC | SBS/SBS |
| --- | --- | --- | --- | --- | --- |
| Example 6 | 3.84 | 7.30 | 7.43 | 11.30 | 11.47 |
| Comparative Example 2-C | 2.80 | 1.63 | 3.20 | 1.46 | 1.27 |

What is claimed is:

1. An improved water-based sulfonated polyurethane dispersion composition, said sulfonated polyurethane being a reaction product of
   a) at least one polyisocyanate;
   b) at least one alkylene diol;
   c) at least one sulfonated polyester polyol wherein the sulfo groups thereof are present as alkali metal salts; and
   d) at least one dihydroxy carboxylic acid, or salt thereof; said dihydroxy carboxylic acid providing carboxyl groups on said sulfonated polyurethane, and said carboxyl groups being present in said dispersion as alkali metal salts, organic tertiary amine salts or mixtures thereof.

2. A composition as in claim 1 wherein said polyisocyanate is an aliphatic polyisocyanate.

3. A composition as in claim 2 wherein said dihydroxy carboxylic acid is dimethylolpropionic acid.

4. A composition as in claim 2 wherein said polyisocyanate is selected from the group consisting of isophorone diisocyanate, hexamethylene diisocyanate and mixtures thereof.

5. A composition as in claim 1 wherein said composition is characterized as having a dried film heat activation temperature in the range of from about 50° C. to about 95° C. and heat resistant bonds of greater than 110° C.

6. A composition as in claim 1 further comprising at least one water dispersible polyfunctional crosslinking agent.

7. A composition as in claim 6 wherein said crosslinking agent is selected from the group consisting of isocyanates, aziridines, melamine resins, epoxies, oxazolines and carbodiimides.

8. A composition as in claim 7 wherein said crosslinking agent is present in the composition in an amount from about 8 to about 20 parts by weight, based on 100 parts total solids.

9. A composition as in claim 8 wherein said water dispersible polyfunctional crosslinking agent is a water dispersible polyfanctional isocyanate.

10. A composition as in claim 9 wherein said composition is characterized as having a dried film heat activation temperature in a range from about 50° C. to about 95° C. and heat resistant bonds greater than about 110° C.

11. A composition as in claim 1 further comprising at least one dispersible non-polyurethane based polymer or copolymer selected from the group consisting of acrylics, vinyl/acrylics, styrene/acrylics, vinyl-acetate/ethylene copolymers, polychloroprenes, styrene, styrene/butadiene, starches, dextrins, caseins, animal pectins and mixtures thereof.

12. An improved water-based sulfonated polyurethane composition, the composition comprising an aqueous dispersion of a sulfonated polyurethane polymer formed in the presence of at least one ethylenically unsaturated monomer, and the sulfonated polyurethane polymer being a reaction product of
   a) at least one polyisocyanate;
   b) at least one alkylene diol;
   c) at least one sulfonated polyester polyol wherein the sulfo groups thereof are present as alkali metal salts; and
   d) at least one dihydroxy carboxylic acid, or salt thereof; said dihydroxy carboxylic acid providing carboxyl groups on said sulfonated polyurethane, and said carboxyl groups being present in said dispersion as alkali metal salts, organic tertiary amine salts or mixtures thereof.

13. A composition as in claim 12 wherein said ethylenically unsaturated monomer is selected from the group consisting of methyl methacrylate, butyl acrylate and mixtures thereof.

14. A composition as in claim 13 wherein said at least one ethylenically unsaturated monomer is free radically polymerized after formation of said sulfonated polyurethane to form a water-based sulfonated polyurethane/acrylic interpenetrating network.

15. A composition as in claim 14 wherein said composition is characterized as having a dried film heat activation temperature in a range from about 50° C. to about 95° C. and heat resistant bonds of greater than 110° C.

16. A composition as in claim 14 further comprising at least one water dispersible polyfunctional crosslinking agent.

17. A composition as in claim 16 wherein said crosslinking agent is selected from the group consisting of isocyanates, aziridines, melamine resins, epoxies, oxazolines and carbodiimides.

18. A composition as in claim 17 wherein said crosslinking agent is present in the composition in an amount from about 8 to about 20 parts by weight, based on 100 parts total solids.

19. A composition as in claim 17 wherein said water dispersible polyfunctional crosslinking agent is a water dispersible polyfunctional isocyanate.

20. A composition as in claim 14 further comprising at least one water dispersible non-polyurethane based polymer or copolymer selected from the group consisting of acrylics, vinyl/acrylics, styrene/acrylics, vinyl-acetate/ethylene copolymers, polychloroprenes, styrene, styrene/butadiene, starches, dextrins, casein, animal pectin and mixtures thereof.

21. A method of bonding a pair of substrates comprising applying a composition as in claim 1 to at least one of said substrates, drying said composition and then joining the two substrates with heat and pressure.

22. A bonded assembly prepared by the method of claim 21 wherein at least one of said substrates is a member selected from the group consisting of leather, polyvinyl chloride, polyurethane, cloth, nylon fabric, vulcanized rubbers, ethylene vinyl acetate, polypropylene, polyamide, styrene butadiene copolymers, natural rubber, fiberboard, polyester, polystyrene, wood, nylon and polyethylene.

23. In a method of manufacturing an article of footwear wherein a composition comprising an aqueous dispersion of a polyurethane polymer is utilized as an adhesive, coating or primer on at least one portion of said article of footwear, the improvement wherein the polyurethane polymer is a reaction product of a) at least one polyisocyanate;
   b) at least one alkylene diol;
   c) at least one sulfonated polyester polyol wherein the sulfo groups are present as alkali metal salts; and
   d) at least one dihydroxy carboxylic acid, or salt thereof; the carboxyl groups of said dihydroxy carboxylic acid being present in said dispersion as alkali metal salts, organic tertiary amine salts and mixtures thereof.

24. An article of footwear having an adhesive, coating or primer layer on at least one portion thereof, said layer comprising a polyurethane polymer, said polyurethane polymer being a reaction product of a) at least one polyisocyanate;
   b) at least one alkylene diol;
   c) at least one sulfonated polyester polyol wherein the sulfo groups are present as alkali metal salts; and
   d) at least one dihydroxy carboxylic acid, or a salt thereof selected from the group consisting of alkali metal salts, organic tertiary amine salts and mixtures thereof.

25. An article of footwear as in claim 24 wherein said layer comprises a dried film of an aqueous dispersion comprising said polyurethane polymer and a copolymer of an ethylenically unsaturated compound.

* * * * *